May 11, 1937.  F. J. WOOD  2,079,755
FILTER
Filed Aug. 3, 1935

Inventor:
Floyd J. Wood

Patented May 11, 1937

2,079,755

UNITED STATES PATENT OFFICE 2,079,755

FILTER

Floyd J. Wood, Niles, Mich.

Application August 3, 1935, Serial No. 34,571

4 Claims. (Cl. 210—201)

My invention relates to filters and has for an object to provide a compact, novel and efficient filter of the closed or pressure type.

Another object of my invention is to provide means and methods by which to secure easy, simple and rapid assembly or dis-assembly of filter parts.

Another object, ancillary to the last, is to provide advantageous construction of adjacent parts, and an auxiliary guide member, to the end that the movement of the parts along the guide member to or from their relative operating positions may be facilitated.

Another object of my invention is to provide novel means and methods by which multiple filtering surfaces may be moved to contact other parts, within the filter, with the resultant removal of accumulated deposit from said surfaces, by means extending outside the closed containing vessel, while the filtering surfaces are continuously retained in an operating position.

My invention also contemplates the provision in combination within the filter assembly, of means for distillation of volatile liquids from the filter.

The objects and advantages of my invention will be apparent from the following description when considered in connection with the accompanying drawing wherein.

In the drawing, which shows one embodiment of my invention, like parts shown in the various figures are designated by the same reference figures.

Figure 1:
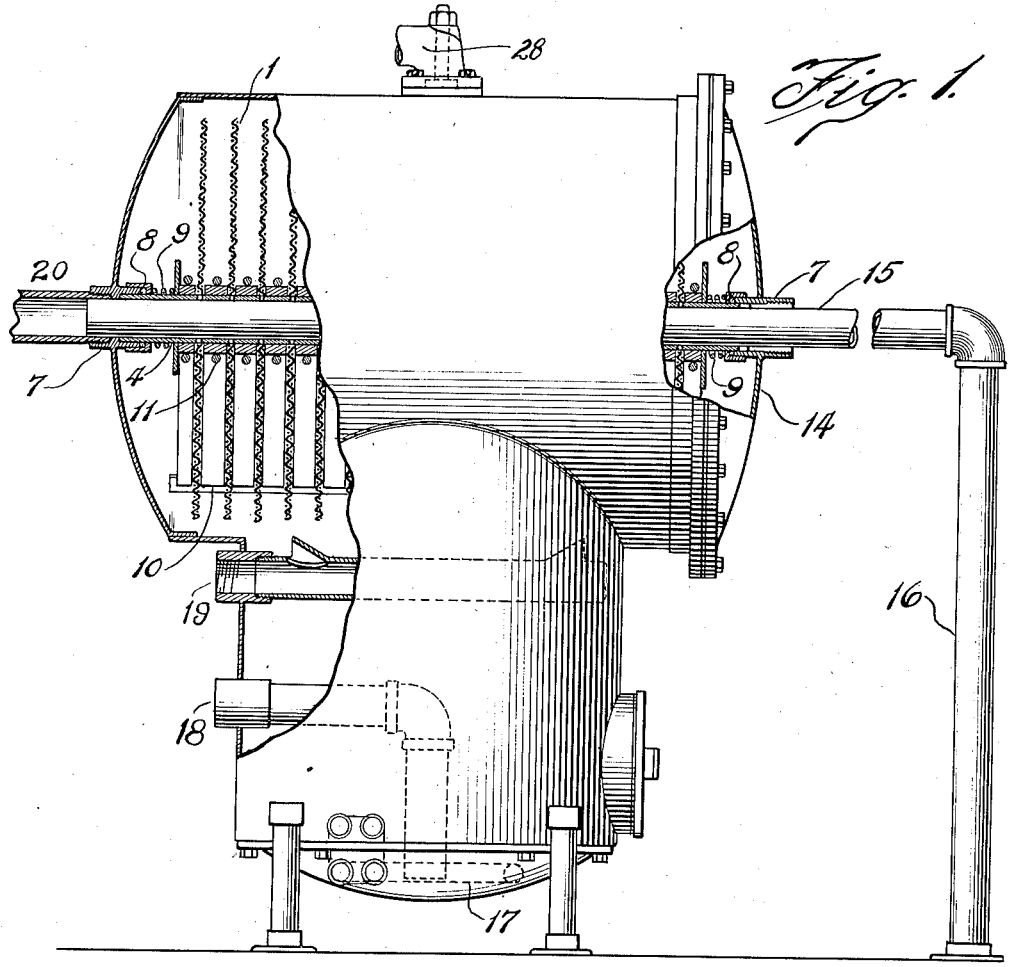
Figure 1 is a side elevation of the filter showing the filter unit assembled within the shell of the enveloping vessel, and the demountable section or head affixed to the filter shell.
Figure 2:
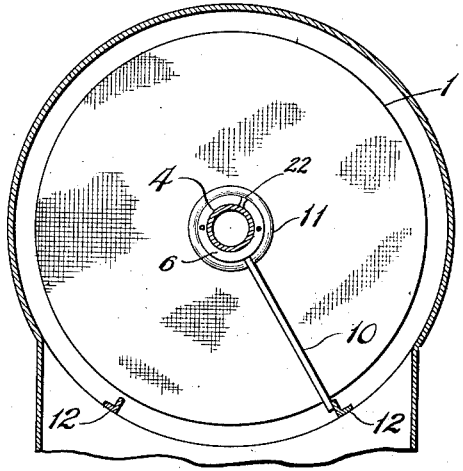
Figure 2 is a cross sectional view through the shell and outlet tube showing a filter pad, a scraper bar and its supporting ring around a spacing collar, and the check stops which engage the ends of the scraper bars.
Figures 3, 4:
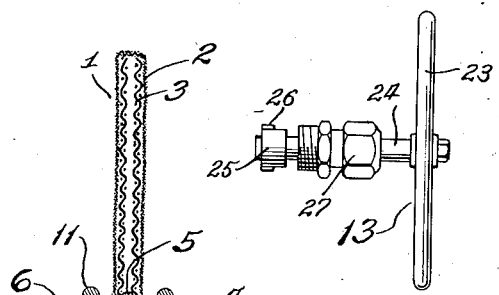
Figure 3 is an enlarged cross sectional view showing filter pad construction, two spacing collars, the rod through spacing collars and pads, and the scraper bar supporting rings.
Figure 4 is a detail of the externally operated hand control which is the means for rotating the filter unit.

My improved filter unit, in the form illustrated, includes filter pads 1 made up of fine mesh wire cloth 2 covering an inner core of coarser wire mesh 3 which supports the pads 1 in a vertical position. The filter pads 1 are constructed so as to provide relatively flat surfaces and afford a free passage for the filtered liquid to an outlet tube 4. Each pad is stiffened and held distended at its place of communication with the outlet tube 4 by a stiff fluted metal piece 5 within the core of the pad 1. Spacing washers or locking collars 6 are mounted on the outlet tube 4 between the pads 1 and held in position by set screws 22. Pliable gaskets are placed between the pads 1 and locking collars 6. The liquid flows from the core spaces in the filter pads 1 through holes in the tube 4 leading to the outlet 20 in the shell of the filter.

The outlet tube 4 on which the filter pads 1, spacing collars 6, scraper bars 10, and sliding packing gland rings 8 are mounted, is supported at its ends by coupling sleeves 7 which are rigidly attached to the vessel shell. By the use of a gland and packing ring 8 pressed against the ends of the couplings 7 by springs 9, a filtering seal is provided and the outlet tube 4 is permitted practically free and unrestrained rotation. In the spaces between and so as to contact the sides of each filter pad 1 are scraper bars 10 supported by the rigidly attached rings 11 which are free to turn on the spacing collars 6. The swing of the scraping bars 10 is limited at their outer ends by stops 12 fixed to the inside of the shell.

The main body of the filter shell has a demountable section or head 14 through which the entire filter unit may be removed. This is accomplished by first removing the external hand rotation control 13 (further described below) and then inserting an auxiliary guide member 15 within the outlet tube 4. This guide member 15 is supported at its inserted end by projecting into the pipe in the outlet opening 20, and at the other end by a pipe stand or other support 16, external to the vessel, and resting on the floor. The demountable section or head 14 and the filter unit assembly may then be slid free from the vessel on the guide member 15. In returning the filter unit within the vessel the guide member provides a positive and easy means of return to its operating position, as the parts to be moved are a close sliding fit on the guide member 15.

Figure 1 shows the filter unit with the guide member 15 in place, and with the control 13 removed. When the filter is in use, of course, the member 15 is removed and the control 13 is back in place.

The fluid to be filtered is made to enter the vessel at the inlet 19, entirely filling the vessel and submerging the filter pads 1. The pressure within the filter causes the fluid to pass through the fine mesh screen 2 into the passages within the core and from there into the tube 4 and through the outlet 20.

The cleaning operation consists of the rotation of the tube 4 carrying the filter unit, by the externally operated hand control 13. The control 13 incldes a hand wheel 23 having rigidly attached thereto a shaft 24 having at its end a closure 25 for the outlet tube 4 and which closure has keys 26 seating in corresponding recesses in the end of the tube 4. The shaft 24 is rotatably mounted in a packing member 27 adapted to be threaded into the end of the right-hand sleeve 7. The rotation cleans the pads 1 by causing their surfaces to scrape against the bars 10. The inclined position of the scraping bars 10, when their movement is checked, allows the refuse materials to drop into the sludge chamber.

Volatile solvents and their vapors may be removed from the filter through a vapor outlet 28 having a suitable manually operated valve or the like, by distillation, using the heating element 17, thereby minimizing the loss of fluid in the sludge and removing noxious vapors.

What I claim as new and desire to secure by Letters Patent, is:

1. A filter comprising a closed vessel having its ends provided with coaxial sleeves, one of said ends being removable, an outlet pipe secured to and communicating with one of said sleeves, an outlet tube within said vessel provided with filter means and having its ends rotatably mounted in said sleeves, a member mounted in the other of said sleeves, and a device rotatably mounted in said member and which interengages inside the sleeve with the end of the outlet tube and which has outside the filter means for turning it to rotate the outlet tube.

2. A filter comprising a closed vessel having its ends provided with coaxial sleeves, one of said ends being removable, an outlet pipe secured to and communicating with one of said sleeves, an outlet tube within said vessel provided with filter means and having its ends rotatably mounted in said sleeves, a member mounted in the other of said sleeves, a device rotatably mounted in said member and which interengages inside the sleeve with the end of the outlet tube and which has outside the filter means for turning it to rotate the outlet tube, packing gland rings mounted on the ends of the outlet tube adjacent said sleeves respectively, and means for yieldingly urging the rings lengthwise of the outlet tube in opposite directions against said sleeves.

3. A filter comprising a closed vessel having its ends provided with coaxial sleeves, one of said ends being removable, an outlet pipe secured to and communicating with one of said sleeves, an outlet tube within said vessel provided with filter means and having its ends rotatably mounted in said sleeves, packing gland rings mounted on the ends of the outlet tube adjacent said sleeves respectively, and springs confined between the respective rings and the corresponding ends of the filter means for yieldingly urging the rings lengthwise of the outlet tube in opposite directions against said sleeves.

4. A filter comprising a stationarily supported closed vessel having its ends provided with coaxial sleeves, one of said ends being removable, an outlet pipe secured to and communicating with the sleeve at the other of said ends, the sleeve in the removable end being adapted to be closed when the filter is in use, an outlet tube within said vessel provided with filter means and having its ends rotatably mounted in said sleeves, in combination with a support for use when said filter is being cleaned and which includes a horizontal member rigidly mounted at one end and which is formed and arranged to pass through the sleeve on the removable end of the vessel and through the outlet tube and into the sleeve on the other end of the vessel, whereby said horizontal member is supported at its end by said other end of the vessel, and which is long enough to permit the removable end and the outlet tube with its filter means all to be slid axially thereon to remove the filter means from the vessel.

FLOYD J. WOOD.